(12) United States Patent
Cai et al.

(10) Patent No.: US 10,439,281 B2
(45) Date of Patent: Oct. 8, 2019

(54) CALIBRATED CIRCUIT BOARDS AND RELATED INTEGRATED ANTENNA SYSTEMS HAVING ENHANCED INTER-BAND ISOLATION

(71) Applicant: CommScope Technologies LLC, Hickory, NC (US)

(72) Inventors: Lishao Cai, Suzhou (CN); Jing Sun, Suzhou (CN); Li Qiu, Suzhou (CN)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/769,633

(22) PCT Filed: Oct. 26, 2016

(86) PCT No.: PCT/CN2016/103382
§ 371 (c)(1),
(2) Date: Apr. 19, 2018

(87) PCT Pub. No.: WO2017/071583
PCT Pub. Date: May 4, 2017

(65) Prior Publication Data
US 2018/0316092 A1 Nov. 1, 2018

Related U.S. Application Data

(60) Provisional application No. 62/247,943, filed on Oct. 29, 2015.

(51) Int. Cl.
*H01Q 3/26* (2006.01)
*H01Q 1/24* (2006.01)
(Continued)

(52) U.S. Cl.
CPC ............ *H01Q 3/267* (2013.01); *H01Q 1/246* (2013.01); *H01Q 21/0075* (2013.01);
(Continued)

(58) Field of Classification Search
CPC .......... H04B 1/0458; H04B 1/44; H04B 1/18; H04B 1/48
(Continued)

(56) References Cited

U.S. PATENT DOCUMENTS 5,212,815 A   5/1993   Schumacher
5,389,939 A   2/1995   Tang et al.
(Continued)

FOREIGN PATENT DOCUMENTS

CN   100382384       4/2008
CN   101359777 A    2/2009
(Continued)

OTHER PUBLICATIONS

International Search Report and Written Opinion of the International Searching Authority, International Application PCT/CN2016/103382, dated Feb. 6, 2017, 12 pp.
(Continued)

*Primary Examiner* — Sam Bhattacharya
(74) *Attorney, Agent, or Firm* — Myers Bigel, P.A.

(57) ABSTRACT

Calibration circuit boards (112) may enhance the inter-band isolation of radiating units (114) of an antenna (100) that operates in more than one frequency band. The calibration circuit board (112) may be configured to transport signals to two or more radiating units (114). The radiating units (114) may be configured to operate in a first frequency band. The antenna (100) may include another radiating unit that is configured to operate in a second frequency band. The antenna (100) also includes one or more filters connected to one or more input ports (121) of the calibration circuit board (112).

19 Claims, 4 Drawing Sheets

(51) Int. Cl.
*H01Q 21/00* (2006.01)
*H04B 17/00* (2015.01)
*H04B 17/12* (2015.01)
*H04B 17/21* (2015.01)
*H04W 16/28* (2009.01)
*H04W 88/08* (2009.01)

(52) U.S. Cl.
CPC ......... *H04B 17/0085* (2013.01); *H04B 17/12* (2015.01); *H04B 17/21* (2015.01); *H04W 16/28* (2013.01); *H04W 88/08* (2013.01)

(58) Field of Classification Search
USPC ............ 455/103, 127.1, 562.1; 333/113, 134
See application file for complete search history.

(56) References Cited

U.S. PATENT DOCUMENTS

| | | | | |
|---|---|---|---|---|
| 2010/0248651 | A1* | 9/2010 | Dent | H01Q 1/246 455/78 |
| 2012/0249263 | A1* | 10/2012 | Zhang | H04B 1/0057 333/132 |
| 2012/0249374 | A1 | 10/2012 | Wang | |
| 2013/0260844 | A1 | 10/2013 | Rucki et al. | |
| 2014/0349720 | A1* | 11/2014 | Uejima | H04B 1/006 455/575.1 |
| 2015/0070216 | A1* | 3/2015 | Alexopoulos | H01Q 3/247 342/368 |

FOREIGN PATENT DOCUMENTS

| | | |
|---|---|---|
| CN | 101916919 | 12/2010 |
| CN | 102013559 A | 4/2011 |
| CN | 102237569 A | 11/2011 |
| EP | 0828308 | 3/1998 |
| WO | 2014/169934 | 10/2014 |
| WO | 2015/066883 | 5/2015 |

OTHER PUBLICATIONS

Extended European Search Report corresponding to European Application No. 16859018.0 (dated May 24, 2019).

Chinese Office Action corresponding to Chinese Patent Application No. 201680055405.2 (dated Jul. 2, 2019).

\* cited by examiner

CALIBRATED CIRCUIT BOARDS AND RELATED INTEGRATED ANTENNA SYSTEMS HAVING ENHANCED INTER-BAND ISOLATION

CROSS-REFERENCE TO RELATED APPLICATIONS

This application is a 35 U.S.C. § 371 national stage application of PCT Application Serial No. PCT/CN2016/103382, filed on Oct. 26, 2016, which itself claims priority under 35 U.S.C. § 119 to U.S. Provisional Patent Application Ser. No. 62/247,943, filed Oct. 29, 2015, the entire contents of both of which are incorporated herein by reference. The above-referenced PCT Application was published in the English language as International Publication No. WO 2017/071583 A1 on May 4, 2017.

TECHNICAL FIELD

Aspects of the present disclosure relate to calibration circuit boards for antenna systems, and more particularly, to integrated antenna systems that include such calibration circuit boards.

BACKGROUND

Active beam scanning antennas are now being deployed in cellular communications systems. An active beam scanning antenna may be located at or near a cellular base station, and may adjust the amplitude and/or phase of the sub-components of a signal that is to be transmitted through the antenna. By adjusting the amplitudes and/or phases of the signal sub-components, the shape and pointing direction of the antenna beam formed by the active beam scanning antenna may be changed. Thus, the antenna may, for example, create different antenna beams during different time slots that point in different directions to provide high directivity antenna beams on a time slot-by-time slot basis that point at individual mobile users or groups of mobile users.

As shown in FIG. 1, an active beam scanning antenna 10 may include an antenna interface unit 11, a calibration circuit board 12, phase shifters 13 and radiating units 14. Each radiating unit 14 may comprise, for example, a vertically-disposed column of individual radiating elements. Typically, the active beam scanning antenna 10 will include multiple phase shifters 13 and radiating units 14. The antenna interface unit 11 may connect the antenna 10 to a main control system. Signals that are to be transmitted by the active beam scanning antenna 10, and signals that are received by the active beam scanning antenna 10, may be passed through the antenna interface unit 11 to the main control system. The phase shifters 13 may be used to divide a radio frequency ("RF") signal that is to be transmitted by the antenna into a plurality of sub-components and to adjust the phase differences between these sub-components of the RF signal. The sub-components are then fed to individual radiating elements (or sub-arrays of radiating elements) that are included in the respective radiating units 14. The phase differences may be adjusted in order to electronically adjust an elevation or downtilt angle of the active beam scanning antenna 10. In some cases, the phase shifters 13 may be omitted and replaced with a power divider circuit board that divides the RF signal to be transmitted into sub-components that are fed to the individual radiating elements (or sub-arrays of radiating elements) that are included in the respective radiating units 14. The power divider circuit board may also set fixed phase differences between the signals supplied to the individual radiating elements (or sub-arrays of radiating elements).

The calibration circuit board 12 may be interposed between the antenna interface unit 11 and the radiating units 14. Calibration test signals may be transmitted from the antenna interface unit 11 to the radiating units 14 via the phase shifters 13. The calibration circuit board 12 may extract portions of the respective calibration test signals that are transmitted to the radiating units 14. These extracted portions of the calibration test signals may be compared to a reference calibration test signal by the main control system to obtain the amplitude and phase of the sub-components of the RF signal that are fed to each of the radiating units 14. Weighted values for the amplitudes and phases of the sub-components of the signal that is to be transmitted may then be calculated that will provide a desired beam pattern.

When an antenna only includes radiating units that operate in one frequency band, inter-band isolation issues may not arise. However, when radiating units that operate at different frequency bands are integrated into the same antenna, interference between signals in the respective frequency bands may arise.

SUMMARY

Aspects of the present disclosure may be directed to a calibration circuit board capable of enhancing the inter-band isolation of radiating units of an antenna operating in more than one frequency band.

Pursuant to some embodiments, active beam scanning antennas are provided that include a plurality of radiating units that are configured to transmit and receive signals in a first frequency band. Each radiating unit may include a plurality of radiating elements (e.g., a column of radiating elements). The antenna may further include at least one array of radiating elements that are configured to transmit and receive signals in a second frequency band that is different than the first frequency band. The antenna also includes a calibration circuit board that has a plurality of transmission line segments that are connected to the respective radiating units, a plurality of couplers that are provided along the respective transmission line segments, and a filter coupled along and associated with each respective transmission line segment.

In some embodiments, each filter may comprise a first filter line branch that is connected to its associated transmission line segment at a first connection point, and a second filter line branch that is connected to its associated transmission line segment at a second connection point. The first and second connection points may be at spaced apart locations along the associated transmission line segment.

In some embodiments, each first filter line branch may be on a first side of a respective one of the couplers and each second filter line branch may be on a second side of the respective one of the couplers.

In some embodiments, the first and second connection points for each filter may be spaced apart from each other along the filters associated transmission line segment by about ¼ of the wavelength of a frequency in the second frequency band.

In some embodiments, one of the first filter line branches may include a first portion that has a first width and a second portion that has a second width that exceeds the first width by at least 50%. The first portion may directly connect to one of the transmission line segments. The second filter line branch that is part of the same filter as the one of the first filter line branches may include a third portion that has a third width and a fourth portion that has a fourth width that exceeds the third width by at least 50%.

In some embodiments, the first filter line branch of each filter may connect to its associated transmission line segment between a respective input port of the calibration circuit board and a respective one of the couplers. The second filter line branch of each filter may connect to its associated transmission line segment between a respective output port of the calibration circuit board and the respective one of the couplers.

In some embodiments, the first filter line branch of a first of the filters may include a portion that extends generally parallel to at least a portion of its associated transmission line segment.

Pursuant to further embodiments of the present invention, antennas are provided that include a calibration circuit board that has a plurality of input ports and that is configured to transport signals to at least first and second radiating units that are configured to operate in a first frequency band. A first filter is connected to a first of the input ports of the calibration circuit board.

In some embodiments, the antenna may include a third radiating unit that is configured to operate in a second frequency band that is different than the first frequency band.

In some embodiments, the calibration circuit board may include a first transmission line segment that is connected to the first radiating unit through a first phase shifter; a first coupler that is configured to couple to the first transmission line segment; a second transmission line segment that is connected to the second radiating unit through a second phase shifter; and a second coupler that is configured to couple to the second transmission line segment.

In some embodiments, the first transmission line segment may connect to the first of the input ports, and the first filter may comprise a first filter line branch that is connected to the first transmission line segment at a first connection point, and a second filter line branch that is connected to the first transmission line segment at a second connection point, the first and second connection points at spaced apart locations along the first transmission line segment.

In some embodiments, the first filter line branch may be on a first side of the first coupler and the second filter line branch may be on a second side of the first coupler.

In some embodiments, the first and second connection points may be spaced apart from each other along the first transmission line segment by about ¼ of the wavelength of a frequency in the second frequency band.

In some embodiments, the first filter line branch may include a first portion that has a first width and a second portion that has a second width that exceeds the first width by at least 50%.

In some embodiments, the first filter line branch may connect to the first transmission line segment between the first of the input ports and the first coupler. The second filter line branch may connect to the first transmission line segment between a first output port of the calibration circuit board and the first coupler.

In some embodiments, the first filter line branch may include a portion that extends generally parallel to at least a portion of the first transmission line segment.

DETAILED DESCRIPTION

Aspects of the present disclosure are described hereinafter by examples with reference to the accompanying drawings. The components and relationships therebetween may be changed appropriately based on the configuration of any particular device implementing the embodiments of the present invention. In other words, the following aspects are not intended to limit the scope of aspects of the disclosure.

Aspects of the present disclosure may be directed to a calibration circuit board that is capable of providing enhanced inter-band isolation in an integrated antenna system that includes antenna arrays that operate in two or more frequency bands, and to provide an integrated antenna system that includes such a calibration circuit board. The calibration circuit boards and integrated antenna systems of the present disclosure may enhance inter-band isolation, while reducing or avoiding additional insertion loss.

Figure 1:
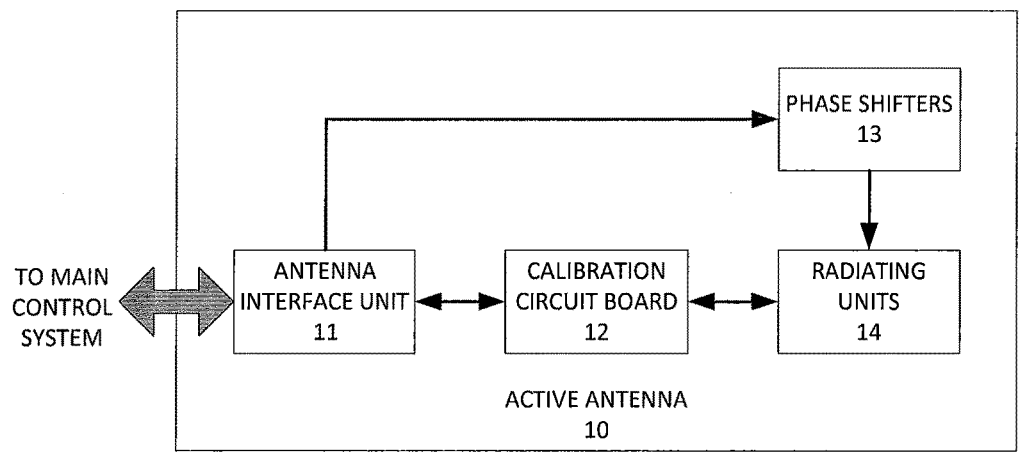
FIG. 1 is a block diagram of a conventional active beam scanning antenna.
Figure 2:
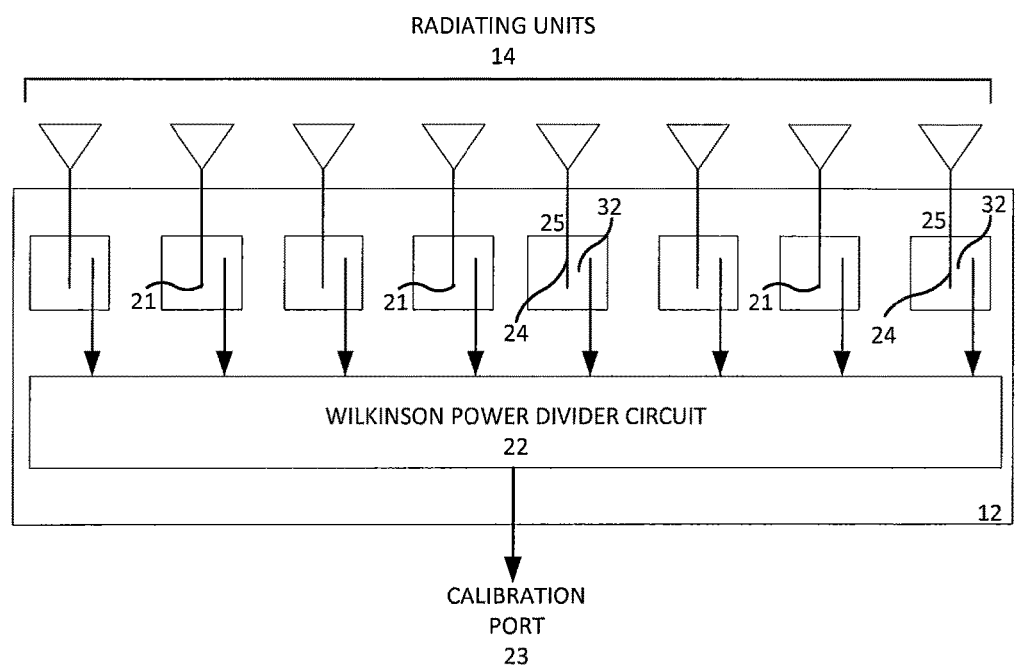
FIG. 2 is a schematic diagram illustrating the structure of a calibration circuit board.

FIG. 2 is a schematic diagram illustrating the basic structure and principle of a calibration circuit board 12. The calibration circuit board 12 that is illustrated in FIG. 2 is used in an antenna that has eight columns of radiating elements (i.e., eight radiating units 14) in the active beam scanning antenna array. This active beam scanning antenna operates in a first frequency band (e.g., a high band such as the 2.5-2.7 GHz frequency band). The antenna may also include one or more columns of radiating elements (not shown) that operate in a second, different frequency band (e.g., a low band such as the 694-960 MHz frequency band). Typically, the columns of radiating elements that operate in the second frequency band are conventional linear arrays that do not have beam scanning capabilities, although embodiments of the present invention are not so limited. It will be appreciated that more or fewer columns of radiating elements may be employed.

As shown in FIG. 2, in an antenna that includes an active beam scanning antenna that has eight columns of radiating elements, the calibration circuit board 12 may include eight signal input ports 21. Each signal input port 21 may be connected to a respective active transceiver (not shown) of the active beam scanning antenna array. When the antenna is operated in its transmit mode, each active transceiver may output a sub-component of an RF signal that is to be transmitted. These sub-components of the RF signal are input to the calibration circuit board 12 at the respective input ports 21, and passed over respective transmission line segments 24 to respective output ports 25. Each output port 25 may be connected to, for example, a radiating unit 14 through, for example, a phase shifter or a feeder power divider board (not shown).

During a calibration operation for the transmit path, calibration test signals may be transmitted through the active transceivers such that they are input to the calibration circuit board 12 at the respective input ports 21. A portion of the power of each of these calibration test signals is coupled from the respective transmission line segments 24 on the calibration circuit board 12 via respective directional couplers 32 and passed to a 3-stage Wilkinson power divider circuit 22 which combines the eight coupled signals into a composite calibration test signal. This composite calibration test signal may be output from the calibration circuit board 12 through a calibration port 23 which may be connected to, for example, a calibration transceiver (not shown). The calibration transceiver may compare the composite test signal to a reference calibration signal. Based on this comparison, the gains and phases of the sub-components of an RF signal that is transmitted by the active transceivers may be adjusted to achieve a desired beam pattern.

Figure 3:
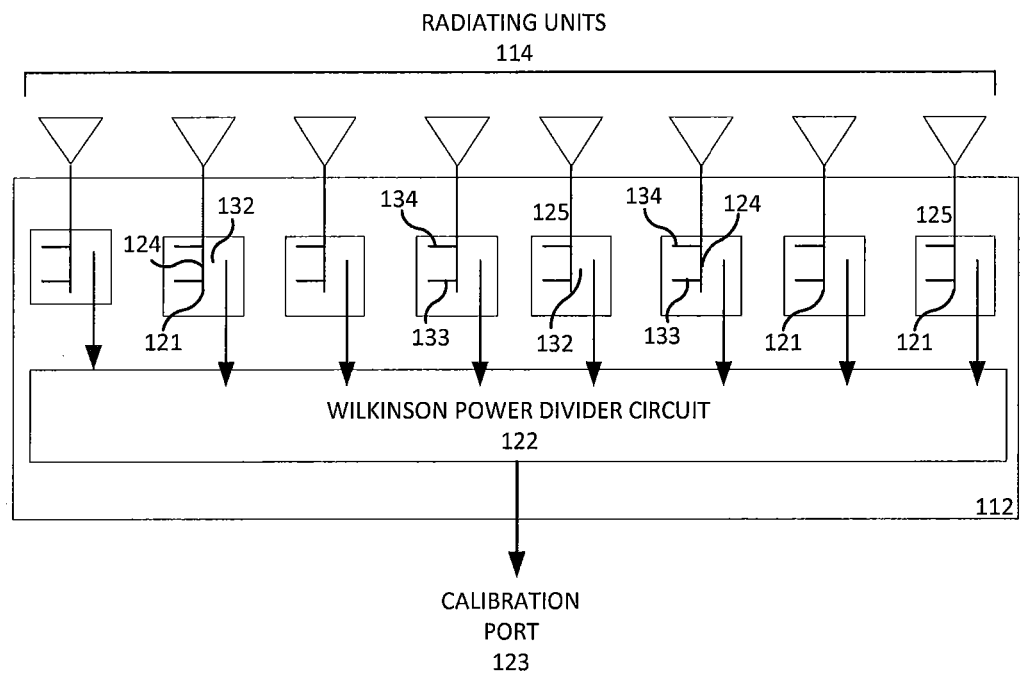
FIG. 3 is a schematic diagram illustrating the structure of a calibration circuit board according to an aspect of the present disclosure.
Figure 4:
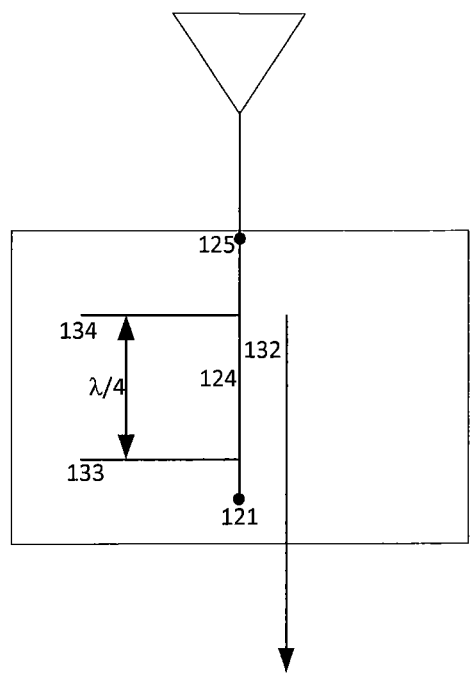
FIG. 4 is an enlarged view illustrating one input port-output port pair in the calibration circuit board of FIG. 3.

FIG. 3 is a schematic diagram illustrating the structure of a calibration circuit 112 board according to embodiments of the present invention, and FIG. 4 is an enlarged view illustrating one of the input port-output port pairs 121, 125 included on the calibration circuit board 112 of FIG. 3. The radiating elements of each radiating unit 114 may be configured to operate in, for example, either a first frequency band or a second frequency band. For purposes of the present example, it will be assumed that the radiating units 114 illustrated in FIG. 3 operates in the first frequency band. The calibration circuit board 112 of FIG. 3 may be similar to the calibration circuit board 12 in FIG. 2, except that each transmission line segment 124 that is formed on the calibration circuit board 112 of FIG. 3 includes two filter line branches 133, 134 that are arranged in parallel at respective locations which are spaced apart along each transmission line segment 124 by about ¼ of the wavelength of the signal to be filtered (which in this example would be signals in the second frequency band). This is shown in FIG. 4. These filter line branches 133, 134 may together form a microwave band-stop filter. The desired filter performance may be obtained by optimization of the lengths and widths of the filter line branches 133, 134 and the width of the transmission line segment 124 so that the band-stop filter will filter out signals in the second frequency band. Thus, when the sub-components of an RF signal are input to the calibration circuit board 112, a portion of each sub-component may pass over a direct RF transmission path (that includes a respective one of the transmission line segments 124) to the radiating elements of a respective one of the radiating units 114 (through intervening elements such as, for example, a phase shifter or feeder power divider board), and another portion of each sub-component may be coupled off the respective transmission line segments 124 by the directional couplers 132 and passed to a 3-stage Wilkinson power divider circuit 122.

Figure 5:
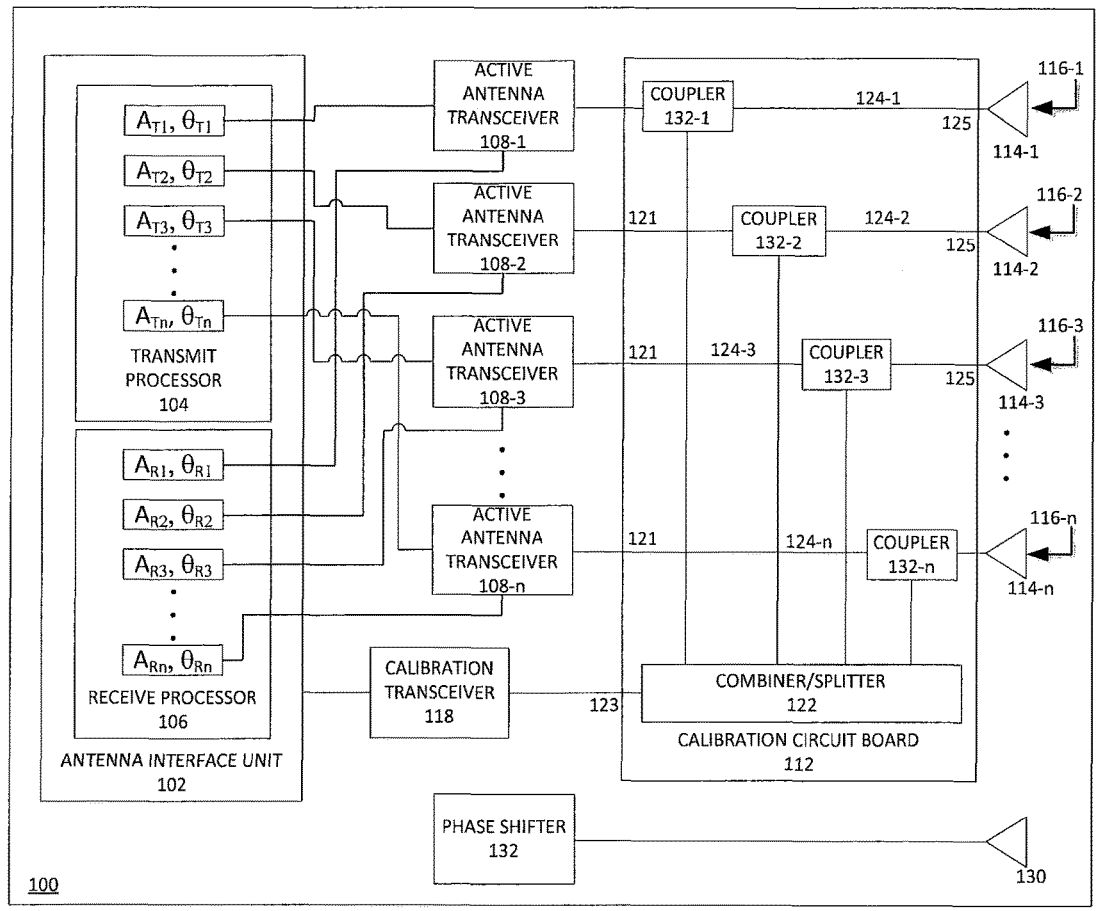
FIG. 5 is a block diagram of an active beam scanning antenna according to embodiments of the present invention.

FIG. 5 is a block diagram illustrating an active beam scanning antenna 100 according to embodiments of the present invention. As shown in FIG. 5, the active beam scanning antenna 100 includes an antenna interface unit 102, the calibration circuit board 112 of FIGS. 3-4, and a plurality of radiating units 114 that operate in a first frequency band. Each radiating unit 114 includes a plurality of individual radiating elements (e.g., a column of radiating elements). The active beam scanning antenna 100 further includes phase shifters (or, alternatively, feeder power divider boards), but the phase shifters have been omitted from FIG. 5 to simplify the drawing. The active beam scanning antenna 100 is a bi-directional system that operates concurrently in both transmit and receive modes. Active beam scanning antenna 100 includes a plurality of active antenna paths 116-1 through 116-n. Each path 116-i includes a transceiver 108-i and a radiating unit 114-i), where i=1, 2, ..., n and n>1. The antenna 100 further includes at least one linear array 130 of radiating elements that operate in a second frequency band. The linear array 130 may be coupled to a radio (not shown) such as remote radio head through, for example, a phase shifter 132. The linear array 130 may comprise a conventional base station antenna linear array and hence further description thereof will be omitted. As will be discussed in more detail below, signals transmitted by the linear array 130 may interfere with signals transmitted through antenna 100 that are in the first frequency band. Note that in the present disclosure when a plurality of like elements (e.g., paths 116-1 through 116-n) are included in a device, these elements may be assigned a two-part reference numeral and the elements may be referred to individually by their full reference numerals (e.g., active path 116-2) and may be referred to collectively by the first part of their reference numeral (e.g., the active paths 116).

The antenna interface unit 102 includes a transmit processor 104 and a receive processor 106. The transmit processor 104 may receive digital signals from a baseband unit (not shown) and the receive processor 106 may provide digitized received signals to the baseband unit. The transmit processor 104 may digitally split a signal that is to be transmitted into n separate sub-components and then apply a desired gain and phase shift to each sub-component. The receive processor 106 may likewise apply a desired gain and phase shift to each sub-component of a digitized received signal and then combine the sub-components.

More specifically, when the active beam scanning antenna 100 is operated in the transmit mode, the transmit processor 104 of antenna interface unit 102 receives a signal that is to be transmitted from the baseband unit, which may be part of the main control system of the base station (not shown). The transmit processor 104 digitally splits the signal to be transmitted into n identical sub-components, and applies a desired transmit gain $A_{Ti}$ and a transmit phase shift $\theta_{Ti}$ to each sub-component of the signal. Each sub-component of the signal is provided to a different active transceiver 108-i that performs processing such as, but not limited to, digital processing, digital-to-analog conversion, and up-conversion to an RF transmit frequency. Each analog sub-component of the RF signal is then fed through a respective phase shifter (not shown) to a corresponding radiating unit 114-i (where each radiating unit comprises a column of radiating elements) that radiates the signal to one or more mobile receivers (not shown). The signals radiated from radiating units 114-1 to 114-n combine to form a radiation pattern or "beam pattern" in front of the active beam scanning antenna 100, and the shape of the beam pattern is selectively controllable by controlling the transmit gains $A_{Ti}$ and transmit phase shifts $\theta_{Ti}$ that are applied to each sub-component of the signal.

When the active beam scanning antenna 100 is operated in the receive mode, each radiating unit 114-i receives a different sub-component of an RF signal that is received from a mobile user (not shown). Each received sub-component of the RF signal is provided to a corresponding active antenna transceiver 108-i. Each active antenna transceiver 108 performs processing such as, but not limited to, low-noise amplification, filtering, conversion to an intermediate frequency, analog-to-digital conversion, and digital processing. After processing, the received sub-components of the signal are passed to the receive processor 106 of antenna interface unit 102 where a desired receive gain $A_{Ri}$ and receive phase shift $\theta_{Ri}$ are applied to each digital sub-component of the received signal. The receive processor 106 combines these sub-components to generate a composite received signal that is provided to the baseband unit (not shown). The sub-components of the received signal combine to form a reception pattern, and the shape of the reception pattern is selectively controllable by controlling the receive gains $A_{Ri}$ and receive phase shifts $\theta_{Ri}$ that are applied to the sub-components of the received RF signal.

By electronically controlling the gain and phase shift on each active antenna path 116, the radiating units 114 of active beam scanning antenna 100 may perform sophisticated beam formation and beam steering in the first frequency band. For example, active beam scanning antenna 100 can electronically set or alter the beam width, beam shape, and beam direction of the antenna beam formed by the radiating units 114 by altering the transmit and receive gains and phase shifts on active antenna paths 116-1 through 116-n.

The RF signals on active antenna paths 116 in both the transmit and receive directions may have uncertain gain and phase values, especially during system power-up. Typically, active antenna transceivers 108 are locked to a common clock source; however, during system boot-up and channel configuration, the clocks and synthesizers on each active antenna transceiver 108 can settle to unknown and random absolute phases $\theta_{Ti}$ and $\theta_{Ri}$. The gains $A_{Ti}$ and $A_{Ri}$ can also be in error relative to desired values. Uncertainty in the gain and phase values may also occur during operation of the active beam scanning antenna 100.

The calibration circuit 112 of FIGS. 3-4 may be used to monitor and control the gain and phase values. As shown in FIG. 5, the calibration circuit 112 includes n directional couplers 132-1 through 132-n, and a passive combiner/splitter 122. A calibration port 123 of the calibration circuit board 112 is coupled to a calibration transceiver 118 via, for example, an RF cable. The calibration circuit board 112 and calibration transceiver 118 may be used to monitor the values (or relative values) of the gains $A_{Ti}$ and $A_{Ri}$ and phases $\theta_{Ti}$ and $\theta_{Ri}$, of all of the active antenna paths 116 so that adjustments may be made thereto. The calibration circuit board 112 may perform (i) an initial calibration to alleviate any misalignments that occur during start-up and (ii) ongoing monitoring and re-adjustment to maintain the desired gains $A_{Ti}$ and $A_{Ri}$ and phases $\theta_{Ti}$ and $\theta_{Ri}$ that assure a desired beam formation.

To calibrate the transmit path, calibration test signals are sent on the active antenna paths 116 from the transmit processor 104 toward radiating units 114. A portion of the power of the calibration test signal sent on each path 116-i is extracted via a corresponding directional coupler 132-i and passed to the combiner/splitter 122. The combiner/splitter may be a Wilkinson power divider 122 in some embodiments. Combiner/splitter 122 sums the test signals to generate a composite calibration test signal that is provided to the calibration transceiver 118. Calibration transceiver 118 performs operations analogous to those of the active antenna transceivers 108 and measures the composite calibration test signal. Calibration transceiver 118 and/or antenna interface unit 102 implements an algorithm to determine adjustments to the transmit gains $A_{Ti}$ and phases $\theta_{Ti}$ of the signals on active antenna paths 116-1 through 116-n. The transmit digital processor 104 then adjusts the transmit gains $A_{Ti}$ and phases $\theta_{Ti}$ of the signals on active antenna paths 116-1 through 116-n. Various algorithms may be used to perform the above-described calibration. As such algorithms are known to those of skill in the art, they will not be described further herein.

To calibrate the receive path, the calibration transceiver 118 sends a test signal to combiner/splitter 122, which splits the calibration test signal into multiple sub-components that are transmitted to the respective couplers 132. A portion of the power of each sub-component of the calibration test signal is transferred via a respective coupler 132-i to a corresponding active antenna path 116-i, where the sub-components are processed by the respective active antenna transceivers 108 and provided to the receive processor 106. The receive processor 106 receives n different versions of the calibration test signal from the n different active antenna paths 116 and uses an appropriate algorithm to alter the receive gains $A_{Ri}$ and phases $\theta_{Ri}$ of the signals received on active antenna paths 116 such that a proper receive antenna beam pattern is formed.

As shown in FIG. 5, the calibration circuit board 112 includes transmission line segments 124 that are part of the active antenna paths 116 that extend between the active antenna transceivers 108 and the respective radiating units 114. The transmission line segments 124 may be implemented, for example, as microstrip RF transmission lines on calibration circuit board 112, and may each be part of a respective direct electrical connection between each respective active antenna transceiver 108 and its associated radiating unit 114. A directional coupler 132 is connected to (or implemented along) each transmission line segment 124. As discussed above, these directional couplers 132 may be used to transfer a small sub-component of the calibration test signal transmitted over each active antenna path 116-i. The sub-components of the calibration test signal that are extracted from the active antenna paths 116 using the directional couplers 132 are passed to the splitter/combiner 122 to form a composite calibration test signal that is fed to the calibration transceiver 118.

Pursuant to embodiments of the present invention, a filter may be added along each transmission line segment 124 of the respective active antenna paths 116. The provision of these filters may reduce the impact of RF signals transmitted by the radiating unit(s) 130 that operate in the second frequency band on the antenna beam patterns of the radiating units 114. In an example embodiment, each filter may be implemented as two filter line branches that are provided in parallel at respective locations along each transmission line segment 124. The filter line branches that form each such filter may, for example, be spaced apart along the respective transmission line segments 124 by about ¼ of the wavelength of the signal to be filtered, and thus together the filter line branches may form an RF band-stop filter. The desired filter performance may be obtained by the optimization of length and/or width of the filter line branches and the widths of the transmission line segments 124 of the active antenna paths 116. In some embodiments, the pair of filter line branches that are spaced apart by a quarter wavelength of the signals to be filtered may be provided on each transmission line segment 124 of the active antenna paths 116. The filter line branches may block RF energy in the second frequency band at which linear array 130 transmits and receives signals.

When radiating units that operate in different frequency bands are integrated together in the same antenna, coupling may occur between the radiating units of different frequency bands that may degrade the transmitted and received signals and/or the antenna patterns produced by the radiating units. As discussed above, in order to reduce such undesired coupling, one or more filter circuits may be included in an active beam scanning antenna that provide increased inter-band isolation. The filter circuits may be implemented on a separate circuit board, or may be integrated into existing circuits of the antenna. One disadvantage of using a separate filter circuit board is that it may cause an increase in the insertion loss along the RF transmission paths.

Filters may be integrated into the existing circuit of an antenna system in order to reduce or avoid the above-described increase in insertion loss. For example, filters may be integrated into a power divider board or a phase shifter of the antenna.

When filters composed of filter line branches are integrated into the power divider board or phase shifter, an additional ¼ wavelength filter line branch may be required to connect two filter line branches, and thus the size of the original component (i.e., the feeding power divider board or phase shifter) may be increased, which can increase the cost of the antenna and/or the loss thereof. Pursuant to embodiments of the present invention, antennas are provided that may reduce the inter-band interference without increasing the size of the antenna by integrating the filter line branches into the calibration circuit board of the antenna.

Figure 6:
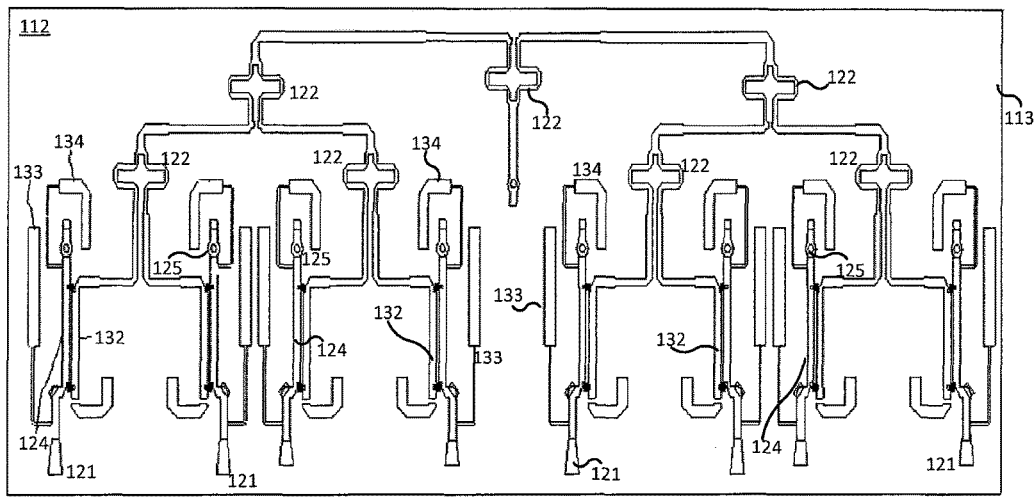
FIG. 6 is a schematic diagram illustrating the circuit wiring of a calibration circuit board according to an aspect of the present disclosure.

FIG. 6 is schematic diagram illustrating the circuit wiring that may be used to implement the calibration circuit board 112 according to an example embodiment of the present disclosure. It will be appreciated that other circuit wirings may be used. In the example shown in FIG. 6, the calibration circuit board 112 includes eight signal input ports 121 and a 3-stage Wilkinson power divider circuit 122 on the circuit substrate 113 of the calibration circuit board 112. Each signal input port 121 may have a similar configuration, and may be connected to a transmission line segment 124 that is part of a direct electrical connection between a respective one of the active antenna transceivers 108 and its associated radiating unit 114. A coupling line 132 may be used to extract a portion of the signal power on each transmission line segment 124. Each coupling line 132 may be connected to the 3-stage Wilkinson power divider circuit 122 so that the eight coupled calibration test signals may be combined into a composite calibration test signal. Filter line branches 133 and 134 may be integrated along each RF transmission line segment 124. As noted above, the filter line branches 133, 134 may be separated by approximately ¼ the wavelength of a signal in the second frequency band.

The substrate 113 of the calibration circuit board 112 may be a two-sided copper bonded dielectric substrate 113, and one side of the substrate 113 may be considered as ground of the calibration circuit board 112, and the copper on the other side of the calibration circuit board substrate 113 may be etched to form the input ports 121, coupling lines 132, filter line branches 133, 134 and Wilkinson power divider circuit 122. The number of input ports 121 may vary and may depend on the specific number of radiating units 114 in the active beam scanning antenna array. Two filter line branches 133 and 134 may be formed at opposed ends of each RF transmission line segment 124 that correspond to the input end and output end of the coupling line 132 respectively. The dielectric substrate 113 may be, for example, an AD300C two-sided copper boned dielectric substrate with the length of 261.0 mm±0.1 mm and the width of 85.0 mm±0.1 mm.

The filter line branch 133 may be located at the input end of each RF transmission line segment 124, and may include two segments. The first segment may be approximately 18.276 mm long and 0.4 mm wide, and the second segment may be approximately 20.5 mm long and 3.013 mm wide.

The filter line branch 134 may be located at the output end of each RF transmission line segment 124, and may include two segments. The first segment may be approximately 9.651 mm long and 0.4 mm wide, and the second segment may be approximately 15.673 mm long and 3.013 mm wide.

It should be noted that the two filter branches 133, 134 with the above parameters may significantly reduce the influence of the second frequency band on the first frequency band when the first frequency band is the 2.5-2.7 GHz frequency band and the second frequency band is the 694-960 MHz frequency band. Different parameters can be used by those skilled in the art according to the teachings of the disclosure to change the length of branches in order to achieve enhanced isolation for different frequency bands. All of these variations fall within the protection scope of the invention.

Figure 7:
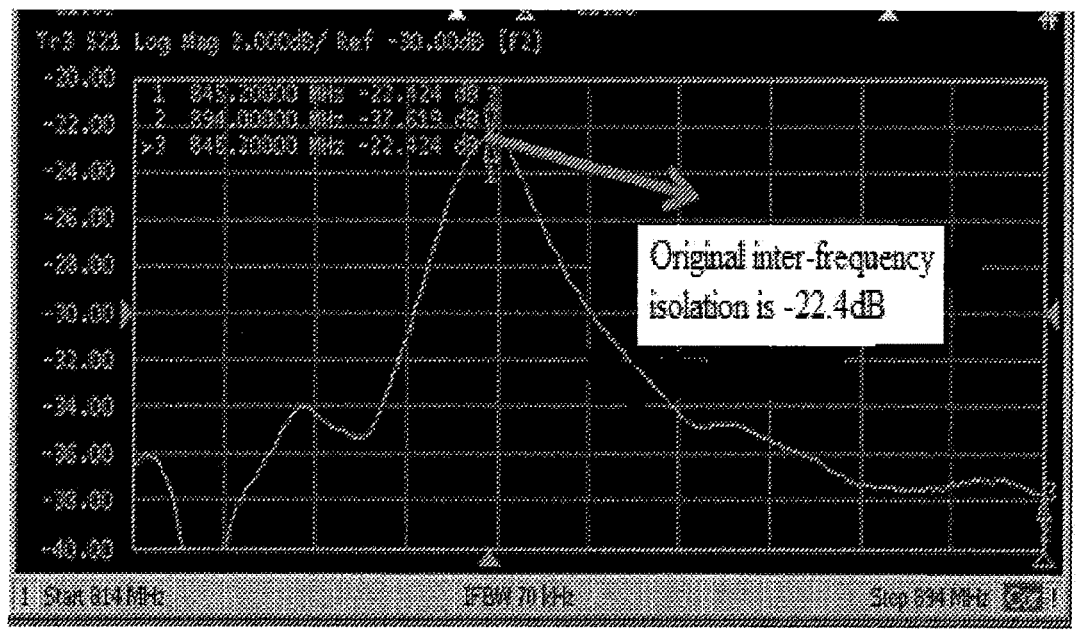
FIG. 7 is a curve illustrating the inter-frequency isolation performance without adding filter line branches.
Figure 8:
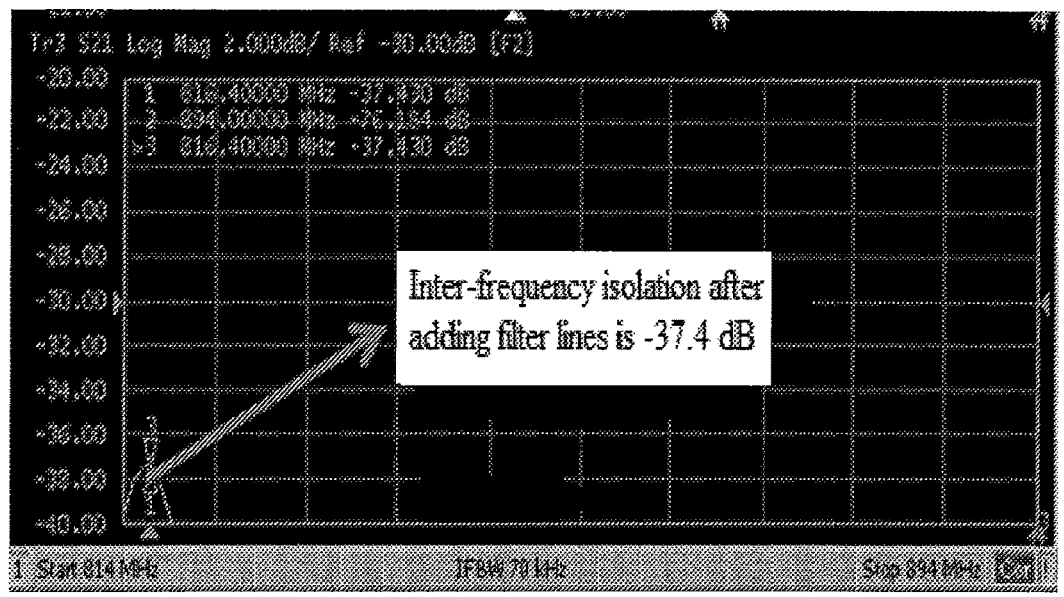
FIG. 8 is a curve illustrating the inter-frequency isolation performance after adding filter line branches according to an aspect of the present disclosure.

FIGS. 7 and 8 are graphs illustrating the inter-band isolation performance without adding filter line branches and after adding filter line branches respectively. The horizontal axes of FIGS. 7 and 8 represent operating frequency (MHz), and the vertical axis represents the isolation (ISO) between a frequency of the active beam scanning antenna and the operating frequency of another one or more linear arrays of radiating elements included in the antenna, in dB.

As shown in FIG. 7, the inter-band isolation when using a conventional calibration circuit board that does not include filter line branches is approximately 22.4 dB. As shown in FIG. 8, the inter-band isolation when using a calibration circuit board with filter line branches according to embodiments of the present disclosure may be approximately 37.4 dB. Thus, in this example, the isolation improves by 15 dB compared to the isolation achieved in FIG. 7.

Consequently, compared with conventional calibration circuit boards of active beam scanning antennas, aspects of the present disclosure may increase the isolation between frequency bands and reduce the inter-band interference. This may provide a possible option for integrating the antennas of different operational frequency bands and thus reducing the number of separate antennas. Also, aspects of the present disclosure may utilize the coupling line at the input port of the calibration circuit board, as the required distance between two filter lines, i.e. ¼ wavelength long line, thereby saving additional space on the calibration circuit board, maintaining the size of original components and devices, and reducing the insertion loss.

Several aspects of the disclosure have been described. It should be appreciated, however, various modifications can be made without departing from the spirit and scope of the invention. Many modifications and variations of the exemplary embodiments of the invention according to the above teachings are possible. Therefore, it should be understood that the invention other than those described specifically herein can be practiced within the scope defined by the appended claims.

That which is claimed is:

1. An active beam scanning antenna, comprising:
   a plurality of radiating units that are configured to transmit and receive signals in a first frequency band, each radiating unit including a plurality of radiating elements;
   at least one array of radiating elements that are configured to transmit and receive signals in a second frequency band that is different than and does not overlap with the first frequency band; and a calibration circuit board, the calibration circuit board comprising:
  a plurality of transmission line segments that are connected to the respective radiating units;
  a plurality of couplers that are provided along the respective transmission line segments; and
  a filter coupled along and associated with each respective transmission line segment.

2. An active beam scanning antenna, comprising:
a plurality of radiating units that are configured to transmit and receive signals in a first frequency band, each radiating unit including a plurality of radiating elements;
at least one array of radiating elements that are configured to transmit and receive signals in a second frequency band that is different than the first frequency band; and
a calibration circuit board, the calibration circuit board comprising:
  a plurality of transmission line segments that are connected to the respective radiating units;
  a plurality of couplers that are provided along the respective transmission line segments; and
  a filter coupled along and associated with each respective transmission line segment, wherein each filter comprises a first filter line branch that is connected to its associated transmission line segment at a first connection point, and a second filter line branch that is connected to its associated transmission line segment at a second connection point, the first and second connection points at spaced apart locations along the associated transmission line segment.

3. The active beam scanning antenna of claim 2, wherein each first filter line branch is on a first side of a respective one of the couplers and each second filter line branch is on a second side of the respective one of the couplers.

4. The active beam scanning antenna of claim 3, wherein the first and second connection points for each filter are spaced apart from each other along the filters associated transmission line segment by about ¼ of the wavelength of a frequency in the second frequency band.

5. The active beam scanning antenna of claim 2, wherein one of the first filter line branches includes a first portion that has a first width and a second portion that has a second width that exceeds the first width by at least 50%.

6. The active beam scanning antenna of claim 5, wherein the first portion of the one of the first filter line branches directly connects to one of the transmission line segments.

7. The active beam scanning antenna of claim 5, wherein the second filter line branch that is part of the same filter as the one of the first filter line branches includes a third portion that has a third width and a fourth portion that has a fourth width that exceeds the third width by at least 50%.

8. The active beam scanning antenna of claim 2, wherein the first filter line branch of each filter connects to its associated transmission line segment between a respective input port of the calibration circuit board and a respective one of the couplers.

9. The active beam scanning antenna of claim 8, wherein the second filter line branch of each filter connects to its associated transmission line segment between a respective output port of the calibration circuit board and the respective one of the couplers.

10. The active beam scanning antenna of claim 2, wherein the filter is configured to block signals in the second frequency band.

11. An antenna, comprising:
  a calibration circuit board having a plurality of input ports, the calibration circuit board configured to transport signals to at least first and second radiating units that are configured to operate in a first frequency band;
  a first filter that is connected to a first of the input ports of the calibration circuit board; and
  a third radiating unit that is configured to operate in a second frequency band that is different than the first frequency band,
  wherein the calibration circuit board comprises:
    a first transmission line segment that is connected to the first radiating unit through a first phase shifter;
    a first coupler that is configured to couple to the first transmission line segment;
    a second transmission line segment that is connected to the second radiating unit through a second phase shifter; and
    a second coupler that is configured to couple to the second transmission line segment.

12. The antenna of claim 11, wherein the first transmission line segment connects to the first of the input ports, and wherein the first filter comprises a first filter line branch that is connected to the first transmission line segment at a first connection point, and a second filter line branch that is connected to the first transmission line segment at a second connection point, the first and second connection points at spaced apart locations along the first transmission line segment.

13. The antenna of claim 12, wherein the first filter line branch includes a portion that extends generally parallel to at least a portion of the first transmission line segment.

14. The antenna of claim 12, wherein the first filter line branch is on a first side of the first coupler and the second filter line branch is on a second side of the first coupler.

15. The antenna of claim 12, wherein the first and second connection points are spaced apart from each other along the first transmission line segment by about ¼ of the wavelength of a frequency in the second frequency band.

16. The antenna of claim 12, wherein the first filter line branch includes a first portion that has a first width and a second portion that has a second width that exceeds the first width by at least 50%.

17. The antenna of claim 12, wherein the first filter line branch connects to the first transmission line segment between the first of the input ports and the first coupler.

18. The antenna of claim 17, wherein the second filter line branch connects to the first transmission line segment between a first output port of the calibration circuit board and the first coupler.

19. The antenna of claim 11, wherein the first filter is configured to block signals in the second frequency band.

* * * * *